(12) United States Patent
Kanemoto

(10) Patent No.: US 9,243,908 B2
(45) Date of Patent: Jan. 26, 2016

(54) GYRO SENSOR AND ELECTRONIC APPARATUS

(71) Applicant: Seiko Epson Corporation, Tokyo (JP)

(72) Inventor: Kei Kanemoto, Suwa (JP)

(73) Assignee: Seiko Epson Corporation (JP)

( * ) Notice: Subject to any disclaimer, the term of this patent is extended or adjusted under 35 U.S.C. 154(b) by 367 days.

(21) Appl. No.: 13/854,269

(22) Filed: Apr. 1, 2013

(65) Prior Publication Data

US 2013/0255378 A1    Oct. 3, 2013

(30) Foreign Application Priority Data

Apr. 2, 2012 (JP) ................................ 2012-083974

(51) Int. Cl.
  *G01C 19/56* (2012.01)
  *G01C 19/5747* (2012.01)
  *G01C 19/5769* (2012.01)

(52) U.S. Cl.
  CPC ............ *G01C 19/56* (2013.01); *G01C 19/5747* (2013.01); *G01C 19/5769* (2013.01)

(58) Field of Classification Search
  CPC ........................ G01C 19/5747; G01C 19/5762
  USPC ..................................................... 73/504.12
  See application file for complete search history.

(56) References Cited

U.S. PATENT DOCUMENTS

| 6,705,164 B2 | 3/2004 | Willig et al. |
| 6,928,872 B2 | 8/2005 | Durante et al. |
| 7,258,008 B2 * | 8/2007 | Durante et al. ............ 73/504.12 |
| 2007/0234803 A1 | 10/2007 | Gomez et al. |

FOREIGN PATENT DOCUMENTS

| JP | 07-218268 | 8/1995 |
| JP | 10-300475 A | 11/1998 |
| JP | 2003-294449 A | 10/2003 |
| JP | 2004-301575 A | 10/2004 |
| JP | 2006-515928 | 6/2006 |
| JP | 2007-322149 A | 12/2007 |

* cited by examiner

*Primary Examiner* — John Chapman, Jr.
(74) *Attorney, Agent, or Firm* — Harness, Dickey & Pierce, P.L.C.

(57) ABSTRACT

A gyro sensor includes: a vibrating body; a first fixed drive electrode that is disposed, in plan view, on a first direction side crossing a driving vibration direction of the vibrating body and vibrates the vibrating body; a second fixed drive electrode that is disposed, in plan view, on the side opposite to the first direction side and vibrates the vibrating body; a fixed detection electrode that detects a signal changing according to angular velocity of the vibrating body; a first drive wiring that is connected with the first fixed drive electrode and extends toward one side in the driving vibration direction; a second drive wiring that is connected with the second fixed drive electrode and extends toward the one side in the driving vibration direction; and a detection wiring that is connected with the fixed detection electrode and extends toward the side opposite to the one side.

13 Claims, 12 Drawing Sheets

GYRO SENSOR AND ELECTRONIC APPARATUS

BACKGROUND

1. Technical Field

The present invention relates to a gyro sensor and an electronic apparatus.

2. Related Art

In recent years, angular velocity sensors (gyro sensors) that detect angular velocity have been developed using, for example, a silicon MEMS (Micro Electro Mechanical Systems) technique.

For example, JP-A-7-218268 discloses a gyro sensor including a vibrating body, a drive electrode that vibrates the vibrating body, and a detection electrode that detects a signal changing according to angular velocity of the vibrating body. The drive electrode and the detection electrode are connected with a drive wiring and a detection wiring, respectively.

However, since an AC voltage is applied to the drive electrode via the drive wiring in the gyro sensor, a current sometimes flows into the detection wiring via a parasitic capacitance generated between the drive wiring and the detection wiring when a portion where the drive electrode and the detection wiring cross each other is present. Such a current cannot be separated from the signal changing according to angular velocity of the vibrating body, so that the detection accuracy of the gyro sensor is sometimes lowered.

SUMMARY

An advantage of some aspects of the invention is to provide a gyro sensor that can suppress the flowing of current into a detection wiring via a parasitic capacitance generated between a drive wiring and the detection wiring. Another advantage of some aspects of the invention is to provide an electronic apparatus having the gyro sensor.

The invention can be implemented as the following modes or application examples.

Application Example 1

A gyro sensor according to this application example includes: a vibrating body; a first fixed drive electrode that is disposed, in plan view, on a first direction side crossing a driving vibration direction of the vibrating body and vibrates the vibrating body; a second fixed drive electrode that is disposed, in plan view, on the side opposite to the first direction side and vibrates the vibrating body; a fixed detection electrode that detects a signal changing according to angular velocity of the vibrating body; a first drive wiring that is connected with the first fixed drive electrode and extends toward one side in the driving vibration direction; a second drive wiring that is connected with the second fixed drive electrode and extends toward the one side in the driving vibration direction; and a detection wiring that is connected with the fixed detection electrode and extends toward the side opposite to the one side.

According to the gyro sensor, it is possible to suppress the flowing of current into the detection wiring via a parasitic capacitance generated between each of the first drive wiring and the second drive wiring and the detection wiring.

Application Example 2

In the gyro sensor according to the application example, the first drive wiring may have a portion that extends, on the one side of the vibrating body, toward the side opposite to the first direction side.

According to the gyro sensor with this configuration, it is possible to more reliably suppress the flowing of current into the detection wiring via a parasitic capacitance generated between each of the first drive wiring and the second drive wiring and the detection wiring.

Application Example 3

In the gyro sensor according to Application Example 1 or 2, the first drive wiring and the second drive wiring may be connected to each other.

According to the gyro sensor with this configuration, the wiring can be shared, so that the number of wirings can be reduced.

Application Example 4

In the gyro sensor according to the application example, the drive wiring and the detection wiring may not cross each other.

According to the gyro sensor with this configuration, it is possible to more reliably suppress the flowing of current into the detection wiring via a parasitic capacitance generated between each of the first drive wiring and the second drive wiring and the detection wiring.

Application Example 5

In the gyro sensor according to the application example, the gyro sensor may further include a movable drive electrode that extends from the vibrating body, and the first fixed drive electrode and the second fixed drive electrode may be disposed to face the movable drive electrode.

According to the gyro sensor with this configuration, it is possible to suppress the flowing of current into the detection wiring via a parasitic capacitance generated between each of the first drive wiring and the second drive wiring and the detection wiring.

Application Example 6

In the gyro sensor according to the application example, the gyro sensor may further include a displacement portion that is connected to the vibrating body via a spring portion and a movable detection electrode that extends from the displacement portion, and the fixed detection electrode may be disposed to face the movable detection electrode.

According to the gyro sensor with this configuration, it is possible to suppress the flowing of current into the detection wiring via a parasitic capacitance generated between each of the first drive wiring and the second drive wiring and the detection wiring.

Application Example 7

In the gyro sensor according to the application example, the shape of the vibrating body may be frame-like, and the fixed detection electrode may be disposed inside the vibrating body.

According to the gyro sensor with this configuration, it is possible to suppress the flowing of current into the detection wiring via a parasitic capacitance generated between each of the first drive wiring and the second drive wiring and the detection wiring.

Application Example 8

An electronic apparatus according to this application example includes the gyro sensor according to the application example.

According to the electronic apparatus, the electronic apparatus can have the gyro sensor that can suppress the flowing of current into the detection wiring via a parasitic capacitance generated between each of the first drive wiring and the second drive wiring and the detection wiring.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail using the drawings. The embodiment described below does not unduly limit the contents of the invention set forth in the appended claims. Moreover, not all of configurations described below are indispensable constituent features of the invention.

1. Gyro Sensor

Figure 1:
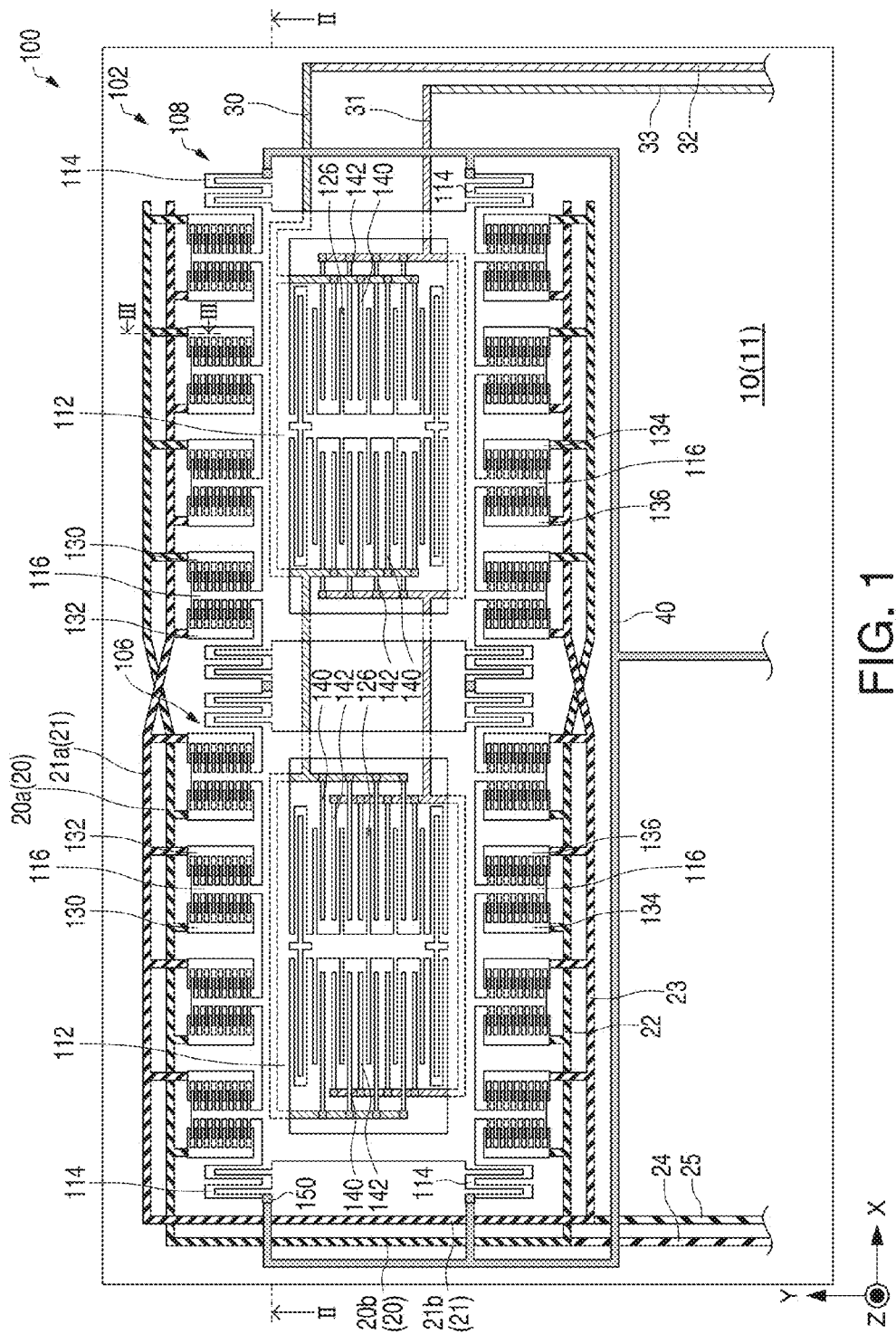
FIG. 1 is a plan view schematically showing a gyro sensor according to an embodiment.
Figure 2:
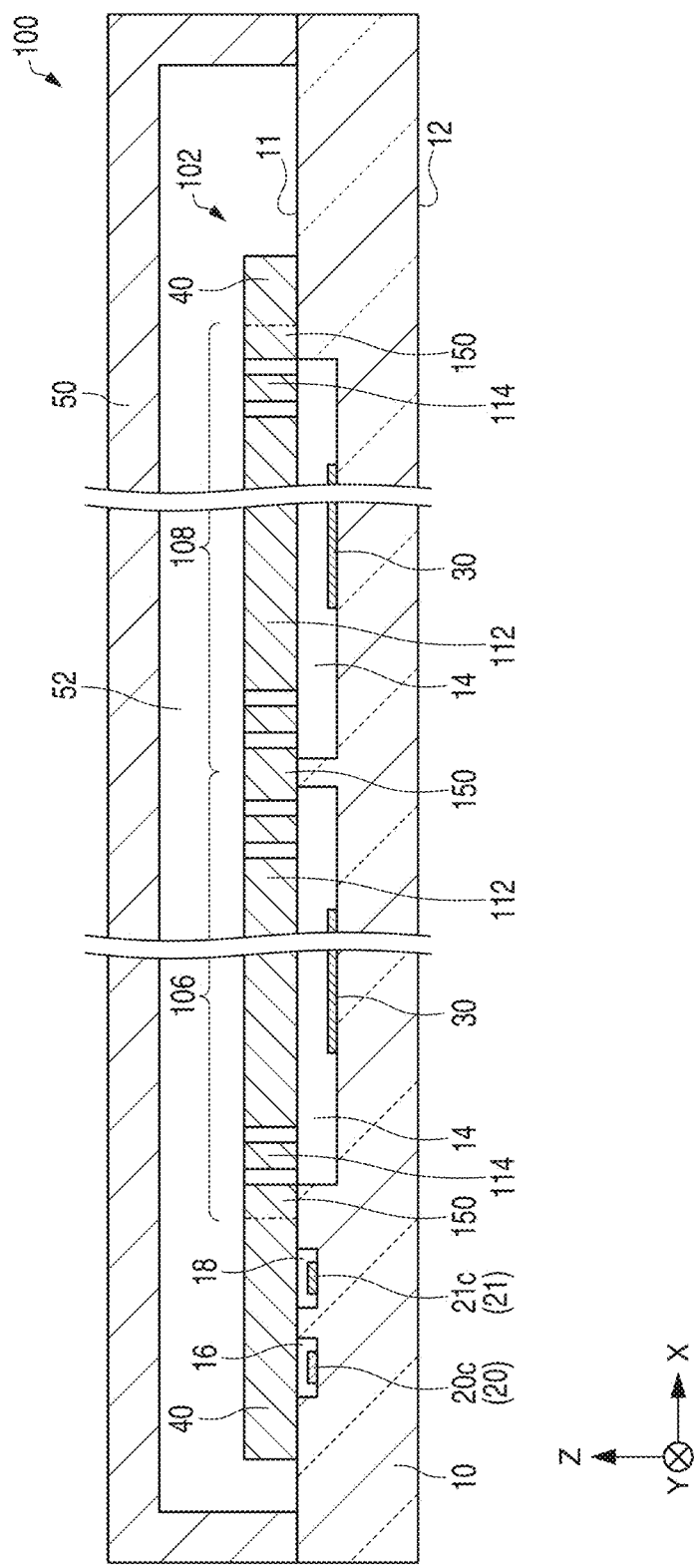
FIG. 2 is a cross-sectional view schematically showing the gyro sensor according to the embodiment.
Figure 3:
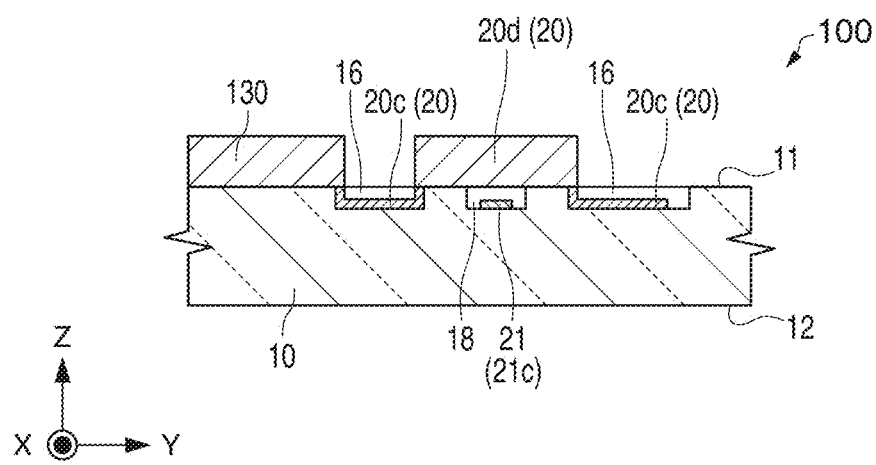
FIG. 3 is a cross-sectional view schematically showing the gyro sensor according to the embodiment.

First, a gyro sensor according to the embodiment will be described with reference to the drawings. FIG. 1 is a plan view schematically showing the gyro sensor 100 according to the embodiment. FIG. 2 is a cross-sectional view schematically showing the gyro sensor 100 according to the embodiment, taken along line II-II of FIG. 1. FIG. 3 is a cross-sectional view schematically showing the gyro sensor 100 according to the embodiment, taken along line III-III of FIG. 1. In FIGS. 1 to 3, an X-axis, a Y-axis, and a Z-axis are illustrated as three axes perpendicular to each other.

As shown in FIGS. 1 to 3, the gyro sensor 100 can include a substrate 10, a functional element 102, first drive wirings 20 and 21, second drive wirings 22 and 23, and detection wirings 30 and 31. The gyro sensor 100 can further include first connection wirings 24 and 25, second connection wirings 32 and 33, a fixed potential wiring 40, and a lid 50. For convenience sake, the illustration of the lid 50 is omitted in FIGS. 1 and 3.

The material of the substrate 10 is, for example, glass or silicon. As shown in FIG. 2, the substrate 10 has a first surface 11 and a second surface 12 on the side opposite to the first surface 11. In the illustrated example, the first surface 11 and the second surface 12 are surfaces parallel to an XY-plane.

Recesses 14 are disposed in the first surface 11 of the substrate 10. Vibrating bodies 112 of the functional element 102 are each disposed above the recess 14 with a gap. The vibrating body 112 can move in a desired direction due to the recess 14 without being obstructed by the substrate 10. The planar shape of the recess 14 is not particularly limited, but is, for example, a rectangle. Further, as shown in FIGS. 2 and 3, groove portions 16 and 18 may be disposed in the first surface 11 of the substrate 10. For convenience sake, the illustration of the recesses 14 and the groove portions 16 and 18 is omitted in FIG. 1.

Figure 4:
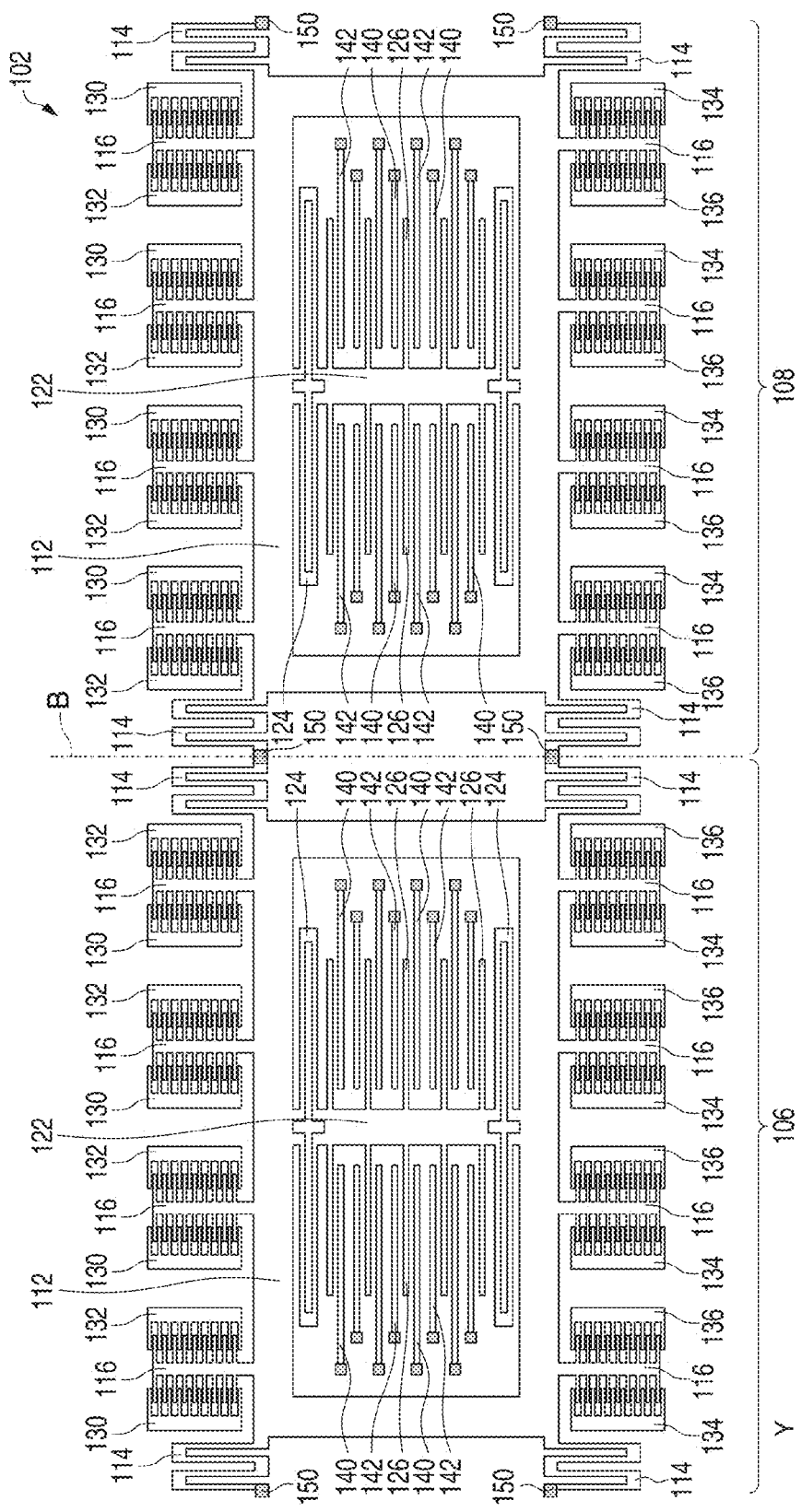
FIG. 4 is a plan view schematically showing a functional element of the gyro sensor according to the embodiment.

The functional element 102 is disposed on the substrate 10 (on the first surface 11 of the substrate 10). In the following, an example will be described in which the functional element 102 is a gyro sensor element (electrostatic capacitive MEMS gyro sensor element) that detects angular velocity about the Z-axis. FIG. 4 is a plan view schematically showing the functional element 102. In FIG. 4, the X-axis, the Y-axis, and the Z-axis are illustrated as three axes perpendicular to each other.

As shown in FIGS. 2 and 4, the functional element 102 has a first structure 106 and a second structure 108. The first structure 106 and the second structure 108 are coupled with each other along the X-axis. The first structure 106 is located on a negative X-direction side of the second structure 108. As shown in FIG. 4, the structures 106 and 108 have a shape in which, for example, they are symmetrical with respect to a border line B (line along the Y-axis) therebetween. Although not illustrated, the functional element 102 may not have the second structure 108, and may be composed of the first structure 106.

As shown in FIG. 4, each of the structures 106 and 108 can have the vibrating body 112, first spring portions 114, movable drive electrodes 116, a displacement portion 122, second spring portions 124, movable detection electrodes 126, first fixed drive electrodes 130 and 132, second fixed drive electrodes 134 and 136, fixed detection electrodes 140 and 142, and fixed portions 150.

The vibrating body 112, the spring portions 114 and 124, the movable drive electrodes 116, the displacement portion 122, the movable detection electrodes 126, and the fixed portions 150 are integrally formed by, for example, processing a silicon substrate (not shown) bonded to the substrate 10. With this configuration, a fine processing technique used in the manufacture of silicon semiconductor devices is applicable, so that a reduction in the size of the functional element 102 can be achieved. The material of the functional element 102 is, for example, silicon provided with conductivity by being doped with an impurity such as phosphorus or boron.

The vibrating body 112 has, for example, a frame-like shape. Inside the vibrating body 112, the displacement portion 122, the movable detection electrodes 126, and the fixed detection electrodes 140 and 142 are disposed.

One end of the first spring portion 114 is connected to the vibrating body 112, while the other end is connected to the fixed portion 150. The fixed portion 150 is fixed on the substrate 10 (on the first surface 11 of the substrate 10). That is, the recess 14 is not disposed below the fixed portion 150. The vibrating body 112 is supported by the fixed portions 150 via the first spring portions 114. In the illustrated example, four first spring portions 114 are disposed in each of the first structure 106 and the second structure 108. The fixed portions 150 on the border line B between the first structure 106 and the second structure 108 may not be disposed.

The first spring portion 114 is configured to be able to displace the vibrating body 112 in an X-axis direction. That is, a driving vibration direction of the vibrating body 112 is the X-axis direction. More specifically, the first spring portion 114 has a shape extending in the X-axis direction (along the X-axis) while reciprocating in a Y-axis direction (along the Y-axis). The number of the first spring portions 114 is not particularly limited as long as the first spring portion 114 can vibrate the vibrating body 112 along the X-axis.

The movable drive electrodes 116 are connected to the vibrating body 112. The movable drive electrode 116 extends from the vibrating body 112 in a positive Y-direction and a negative Y-direction. In the example shown in FIG. 4, the plurality of movable drive electrodes 116 are disposed. The plurality of movable drive electrodes 116 are aligned in the X-axis direction. The movable drive electrode 116 can vibrate along the X-axis with the vibration of the vibrating body 112.

The first fixed drive electrodes 130 and 132 are fixed on the substrate 10 (on the first surface 11 of the substrate 10). The first fixed drive electrodes 130 and 132 are disposed on the positive Y-direction side (first direction side crossing the driving vibration direction of the vibrating body 112) of the vibrating body 112 in plan view.

The first fixed drive electrodes 130 and 132 face the movable drive electrode (first movable drive electrode) 116 extending from the vibrating body 112 in the positive Y-direction, and are disposed to interpose the first movable drive electrode 116 therebetween. More specifically in the first fixed drive electrodes 130 and 132 interposing the first movable drive electrode 116 therebetween, in the first structure 106, the first fixed drive electrode 130 is disposed on the negative X-direction side of the first movable drive electrode 116, while the first fixed drive electrode 132 is disposed on a positive X-direction side of the first movable drive electrode 116. In the second structure 108, the first fixed drive electrode 130 is disposed on the positive X-direction side of the first movable drive electrode 116, while the first fixed drive electrode 132 is disposed on the negative X-direction side of the first movable drive electrode 116. As shown in FIG. 1, the first fixed drive electrode 130 is connected with the first drive wiring 20, while the first fixed drive electrode 132 is connected with the first drive wiring 21.

The plurality of first fixed drive electrodes 130 and 132 are disposed according to the number of the first movable drive electrodes 116, and aligned in the X-axis direction. In the example shown in FIG. 4, the first fixed drive electrodes 130 and 132 have a comb teeth-like shape. The first movable drive electrode 116 has a shape that can be inserted between the teeth of the first fixed drive electrodes 130 and 132.

The second fixed drive electrodes 134 and 136 are fixed on the substrate 10 (on the first surface 11 of the substrate 10). The second fixed drive electrodes 134 and 136 are disposed on the negative Y-direction side (side opposite to the first direction side) of the vibrating body 112 in plan view.

The second fixed drive electrodes 134 and 136 face the movable drive electrode (second movable drive electrode) 116 extending from the vibrating body 112 in the negative Y-direction, and are disposed to interpose the second movable drive electrode 116 therebetween. More specifically in the second fixed drive electrodes 134 and 136 interposing the second movable drive electrode 116 therebetween, in the first structure 106, the second fixed drive electrode 134 is disposed on the negative X-direction side of the second movable drive electrode 116, while the second fixed drive electrode 136 is disposed on the positive X-direction side of the second movable drive electrode 116. In the second structure 108, the second fixed drive electrode 134 is disposed on the positive X-direction side of the second movable drive electrode 116, while the second fixed drive electrode 136 is disposed on the negative X-direction side of the second movable drive electrode 116. As shown in FIG. 1, the second fixed drive electrode 134 is connected with the second drive wiring 22, while the second fixed drive electrode 136 is connected with the second drive wiring 23.

The plurality of second fixed drive electrodes 134 and 136 are disposed according to the number of the second movable drive electrode 116, and aligned in the X-axis direction. In the example shown in FIG. 4, the second fixed drive electrodes 134 and 136 have a comb teeth-like shape. The second movable drive electrode 116 has a shape that can be inserted between the teeth of the second fixed drive electrodes 134 and 136.

The fixed drive electrodes 130, 132, 134, and 136 and the movable drive electrode 116 are electrodes for vibrating the vibrating body 112.

The displacement portion 122 is connected to the vibrating body 112 via the second spring portions 124. In the illustrated example, the planar shape of the displacement portion 122 is an oblong having long sides along the Y-axis. Although not illustrated, the displacement portion 122 may be disposed outside the vibrating body 112.

The second spring portion 124 is configured to be able to displace the displacement portion 122 in the Y-axis direction. More specifically, the second spring portion 124 has a shape extending in the Y-axis direction while reciprocating in the X-axis direction. The number of the second spring portions 124 is not particularly limited as long as the second spring portion 124 can displace the displacement portion 122 along the Y-axis.

The movable detection electrodes 126 are connected to the displacement portion 122. The plurality of movable detection electrodes 126, for example, are disposed. The movable detection electrode 126 extends from the displacement portion 122 in the positive X-direction and the negative X-direction.

The fixed detection electrodes 140 and 142 are fixed on the substrate 10 (on the first surface 11 of the substrate 10). More specifically, one end of each of the fixed detection electrodes 140 and 142 is fixed on the substrate 10, while the other end extends as a free end to the displacement portion 122 side.

The fixed detection electrodes 140 and 142 face the movable detection electrode 126, and are disposed to interpose the movable detection electrode 126 therebetween. More specifically in the fixed detection electrodes 140 and 142 interposing the movable detection electrode 126 therebetween, in the first structure 106, the fixed detection electrode 140 is disposed on the negative Y-direction side of the movable detection electrode 126, while the fixed detection electrode 142 is disposed on the positive Y-direction side of the movable detection electrode 126. In the second structure 108, the fixed detection electrode 140 is disposed on the positive Y-direction side of the movable detection electrode 126, while the fixed detection electrode 142 is disposed on the negative Y-direction side of the movable detection electrode 126. As shown in FIG. 1, the fixed detection electrode 140 is connected with the detection wiring 30, while the fixed detection electrode 142 is connected with the detection wiring 31.

In the example shown in FIG. 4, the plurality of fixed detection electrodes 140 and 142 are disposed and alternately aligned along the Y-axis. The fixed detection electrodes 140 and 142 and the movable detection electrode 126 are electrodes for detecting a signal (electrostatic capacitance) changing according to angular velocity of the vibrating body 112.

As shown in FIGS. 1 to 3, the first drive wirings 20 and 21 are disposed on the substrate 10. The first drive wiring 20 is connected with the first fixed drive electrodes 130 in plan view as shown in FIG. 1. The first drive wiring 20 is a wiring for applying an AC voltage to the first fixed drive electrodes 130. The first drive wiring 20 has a first extending portion 20a disposed on the positive Y-direction side of the vibrating body 112 (of the functional element 102) and a second extending portion 20b disposed on the negative X-direction side of the vibrating body 112 (of the functional element 102).

The first extending portion 20a extends toward the negative X-direction side (one side in the driving vibration direction of the vibrating body 112). More specifically, the first extending portion 20a extends from the first fixed drive electrode 130 located closest to the positive X-direction side in the second structure 108 to the first fixed drive electrode 130 located closest to the negative X-direction side in the first structure 106, and further extends, in the negative X-direction, from the first fixed drive electrode 130 located closest to the negative X-direction side in the first structure 106 to the second extending portion 20b.

The second extending portion 20b extends toward the negative Y-direction side on the negative X-direction side of the vibrating body 112. More specifically, the second extending portion 20b extends, in the negative Y-direction, from the first extending portion 20a to the second drive wiring 22.

The first drive wiring 21 is connected with the first fixed drive electrodes 132 in plan view as shown in FIG. 1. The first drive wiring 21 is a wiring for applying an AC voltage to the first fixed drive electrodes 132. The first drive wiring 21 has a first extending portion 21a disposed on the positive Y-direction side of the vibrating body 112 (of the functional element 102) and a second extending portion 21b disposed on the negative X-direction side of the vibrating body 112 (of the functional element 102).

The first extending portion 21a extends toward the negative X-direction side. More specifically, the first extending portion 21a extends from the first fixed drive electrode 132 located closest to the positive X-direction side in the second structure 108 to the first fixed drive electrode 132 located closest to the negative X-direction side in the first structure 106, and further extends, in the negative X-direction, from the first fixed drive electrode 132 located closest to the negative X-direction side in the first structure 106 to the second extending portion 21b.

The second extending portion 21b extends toward the negative Y-direction side on the negative X-direction side of the vibrating body 112. More specifically, the second extending portion 21b extends, in the negative Y-direction, from the first extending portion 21a to the second drive wiring 23.

As shown in FIG. 3, the first drive wiring 20 can have a first portion 20c disposed in the groove portion 16 and a second portion 20d disposed on the first surface 11. The second portion 20d strides over the groove portion 18 in which the drive wiring 21 is disposed. The material of the first portion 20c is, for example, a metal. The material of the second portion 20d is, for example, silicon provided with conductivity. The first portion 20c and the second portion 20d are connected to each other. With such a configuration, it is possible to prevent the drive wiring 20 and the drive wiring 21 from contacting each other at a portion where the drive wirings 20 and 21 cross each other in plan view. Further, since the drive wiring 20 has the first portion 20c, it is possible to prevent the drive wiring 20 and the fixed potential wiring 40 from contacting each other.

Similarly, the drive wiring 21 may have a first portion 21c disposed in the groove portion 18 and a second portion (not shown) disposed on the first surface 11. With this configuration, it is possible to prevent the drive wiring 21 and the fixed potential wiring 40 from contacting each other.

As shown in FIGS. 1 to 3, the second drive wirings 22 and 23 are disposed on the substrate 10. The second drive wiring 22 is connected with the second fixed drive electrodes 134 in plan view as shown in FIG. 1. The second drive wiring 22 is a wiring for applying an AC voltage to the second fixed drive electrodes 134. The second drive wiring 22 is disposed on the negative Y-direction side of the vibrating body 112 (of the functional element 102).

The second drive wiring 22 extends toward the negative X-direction side. More specifically, the second drive wiring 22 extends from the second fixed drive electrode 134 located closest to the positive X-direction side in the second structure 108 to the second fixed drive electrode 134 located closest to the negative X-direction side in the first structure 106, and further extends, in the negative X-direction, from the second fixed drive electrode 134 located closest to the negative X-direction side in the first structure 106 to the second extending portion 20b of the first drive wiring 20. That is, the first drive wiring 20 and the second drive wiring 22 are connected to each other.

The second drive wiring 23 is connected with the second fixed drive electrodes 136 in plan view as shown in FIG. 1. The second drive wiring 23 is a wiring for applying an AC voltage to the second fixed drive electrodes 136. The second drive wiring 23 is disposed on the negative Y-direction side of the vibrating body 112 (of the functional element 102).

The second drive wiring 23 extends toward the negative X-direction side. More specifically, the second drive wiring 23 extends from the second fixed drive electrode 136 located closest to the positive X-direction side in the second structure 108 to the second fixed drive electrode 136 located closest to the negative X-direction side in the first structure 106, and further extends, in the negative X-direction, from the second fixed drive electrode 136 located closest to the negative X-direction side to the second extending portion 21b of the first drive wiring 21. That is, the first drive wiring 21 and the second drive wiring 23 are connected to each other.

The second drive wirings 22 and 23 may each have, like the first drive wirings 20 and 21, a first portion disposed in a groove portion (not shown) formed in the first surface 11 of the substrate 10 and a second portion disposed on the first surface 11. With this configuration, it is possible to prevent the drive wiring 22 and the drive wiring 23 from contacting each other at a portion where the drive wirings 22 and 23 cross each other in plan view.

The drive wirings 20 and 22 connect the first fixed drive electrodes 130 with the second fixed drive electrodes 134 while surrounding the negative X-direction side of the vibrating body 112 in plan view as shown in FIG. 1. The drive wirings 21 and 23 connect the first fixed drive electrodes 132 with the second fixed drive electrodes 136 while surrounding the negative X-direction side of the vibrating body 112. The drive wirings 20, 21, 22, and 23 are not disposed on the positive X-direction side of the vibrating body 112 (of the functional element 102).

The first connection wirings 24 and 25 are disposed on the substrate 10. The first connection wiring 24 is connected to a crossing portion (connecting portion) of the drive wirings 20 and 22, and extends from the crossing portion in the negative Y-direction in the example shown in FIG. 1. The first connection wiring 25 is connected to a crossing portion (connecting portion) of the drive wirings 21 and 23, and extends from the crossing portion in the negative Y-direction in the example shown in FIG. 1. The first connection wirings 24 and 25 may be respectively connected with pads (not shown) disposed on the substrate 10. The first connection wirings 24 and 25 may each be disposed, like the drive wirings 20 and 21, in a groove portion (not shown) formed in the first surface 11 of the substrate 10.

The detection wiring 30 is disposed on the substrate 10. The detection wiring 30 is connected to the fixed detection electrodes 140 and extends from the fixed detection electrodes 140 toward the positive X-direction side (side opposite to the one side in the driving vibration direction of the vibrating body 112) of the vibrating body 112. More specifically, the detection wiring 30 extends from the fixed detection electrodes 140 of the first structure 106 toward the positive X-direction side of the vibrating body 112 of the first structure 106, is connected to the fixed detection electrodes 140 of the second structure 108, and further extends toward the positive X-direction side of the vibrating body 112 of the second structure 108.

The detection wiring 31 is disposed on the substrate 10. The detection wiring 31 is connected to the fixed detection electrodes 142 and extends from the fixed detection electrodes 142 toward the positive X-direction side of the vibrating body 112. More specifically, the detection wiring 31 extends from the fixed detection electrodes 142 of the first structure 106 toward the positive X-direction side of the vibrating body 112 of the first structure 106, is connected to the fixed detection electrodes 142 of the second structure 108, and further extends toward the positive X-direction side of the vibrating body 112 of the second structure 108.

As shown in FIG. 2, the detection wirings 30 and 31 may each have a portion disposed in the recess 14. With this configuration, it is possible to prevent the detection wirings 30 and 31 and the vibrating body 112 from contacting each other. Further, the detection wirings 30 and 31 may each be disposed, like the drive wirings 20 and 21, in a groove portion (not shown) formed in the first surface 11 of the substrate 10.

The detection wiring 30 does not cross the drive wirings 20, 21, 22, and 23 in plan view. Similarly, the detection wiring 31 does not cross the drive wirings 20, 21, 22, and 23 in plan view. The detection wirings 30 and 31 are wirings for detecting changes in electrostatic capacitances between the movable detection electrode 126 and the fixed detection electrodes 140 and 142.

The second connection wirings 32 and 33 are disposed on the substrate 10. The second connection wiring 32 is connected to the detection wiring 30 and extends from the detection wiring 30 in the negative Y-direction in the example shown in FIG. 1. The second connection wiring 33 is connected to the detection wiring 31 and extends from the detection wiring 31 in the negative Y-direction in the example shown in FIG. 1. The second connection wirings 32 and 33 may be respectively connected with pads (not shown) disposed on the substrate 10. The second connection wirings 32 and 33 may each be disposed, like the drive wirings 20 and 21, in a groove portion (not shown) formed in the first surface 11 of the substrate 10.

The second connection wiring 32 is disposed so as not to cross the first connection wirings 24 and 25 in plan view. Similarly, the second connection wiring 33 is disposed so as not to cross the first connection wirings 24 and 25 in plan view.

The material of the wirings 20, 21, 22, 23, 24, 25, 30, 31, 32, and 33 is, for example, ITO (Indium Tin Oxide), aluminum, gold, platinum, titanium, tungsten, chromium, or silicon provided with conductivity. The material of the wirings 20, 21, 22, 23, 24, 25, 30, 31, 32, and 33 may have, for example, a portion formed of a metal shown above and a portion formed of silicon provided with conductivity.

The fixed potential wiring 40 is disposed on the substrate 10. The fixed potential wiring 40 is connected to the fixed portions 150 of the functional element 102. In the example shown in FIG. 2, the material of the fixed potential wiring 40 is silicon provided with conductivity, and the fixed potential wiring 40 is formed integrally with the fixed portions 150. The fixed potential wiring 40 may extend from the fixed portion 150 to a pad (not shown). The fixed potential wiring 40 is electrically connected with the vibrating bodies 112, the movable drive electrodes 116, the displacement portions 122, and the movable detection electrodes 126 via the fixed portions 150. The fixed potential wiring 40 may have the same potential as that of the vibrating body 112 or the like. The material of the fixed potential wiring 40 is not limited to silicon provided with conductivity, and may be, for example, ITO, aluminum, gold, platinum, titanium, tungsten, or chromium.

As shown in FIG. 2, the lid 50 is disposed on the substrate 10. The substrate 10 and the lid 50 can constitute a package. The substrate 10 and the lid 50 can form a cavity 52. The functional element 102 can be accommodated in the cavity 52. The cavity 52 is hermetically sealed in, for example, a vacuum. The material of the lid 50 is, for example, silicon or glass.

Next, operations of the gyro sensor 100 will be described. FIGS. 5 to 8 explain the operations of the gyro sensor 100. In FIGS. 5 to 8, the X-axis, the Y-axis, and the Z-axis are illustrated as three axes perpendicular to each other. Moreover, for convenience sake, the illustration of members other than the functional element 102 is omitted in FIGS. 5 to 8. Further, the illustration of the movable drive electrode 116, the movable detection electrode 126, the fixed drive electrodes 130, 132, 134, and 136, and the fixed detection electrodes 140 and 142 is omitted to show the functional element 102 in a simplified manner.

Figure 5:
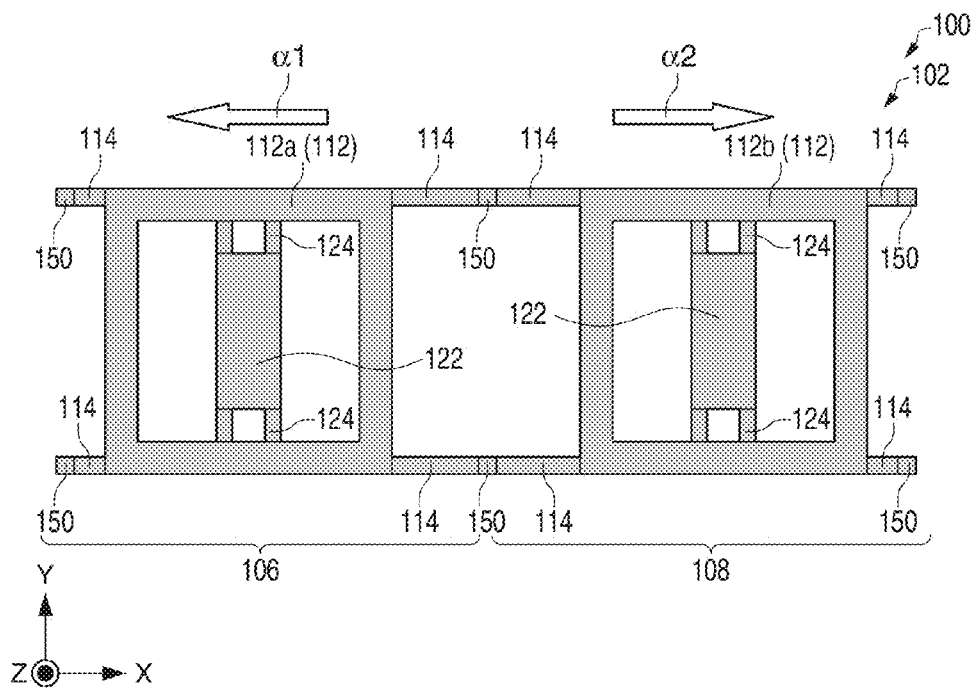
FIG. 5 explains operation of the gyro sensor according to the embodiment.
Figure 6:
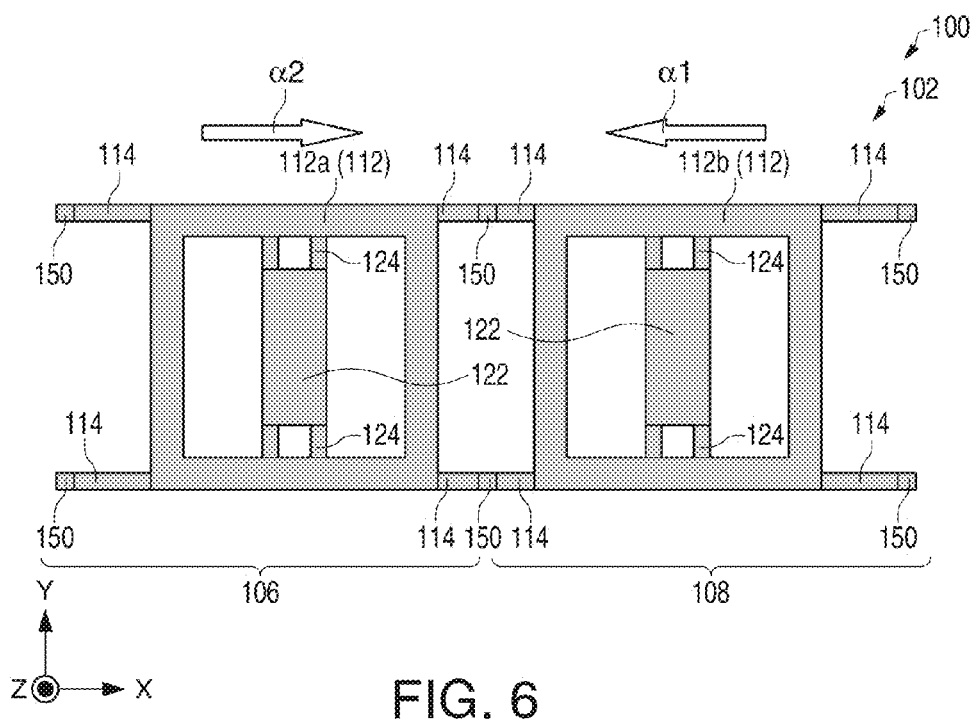
FIG. 6 explains operation of the gyro sensor according to the embodiment.

When a voltage is applied, by a power supply (not shown), between the movable drive electrode (first movable drive electrode) 116 extending from the vibrating body 112 in the positive Y-direction and the first fixed drive electrodes 130 and 132 and between the movable drive electrode (second movable drive electrode) 116 extending from the vibrating body 112 in the negative Y-direction and the second fixed drive electrodes 134 and 136, an electrostatic force can be generated between the movable drive electrode 116 and the fixed drive electrodes 130 and 132 and between the second movable drive electrode 116 and the second fixed drive electrodes 134 and 136 (refer to FIGS. 1 and 4). With this configuration, as shown in FIGS. 5 and 6, the first spring portions 114 can be expanded and contracted along the X-axis, so that the vibrating body 112 can be vibrated along the X-axis.

More specifically, a constant potential Vr is given to the movable drive electrode 116 via the fixed potential wiring 40. Further, a first AC voltage with Vr as a reference is applied to the fixed drive electrodes 130 and 134 via the first connection wiring 24 and the drive wirings 20 and 22. Moreover, a second AC voltage whose phase is shifted by 180 degrees from the first AC voltage with the potential Vr as a reference is applied to the fixed drive electrodes 132 and 136 via the first connection wiring 25 and the drive wirings 21 and 23.

Here, in the first fixed drive electrodes 130 and 132 interposing the first movable drive electrode 116 therebetween, in the first structure 106, the first fixed drive electrode 130 is disposed on the negative X-direction side of the first movable drive electrode 116, while the first fixed drive electrode 132 is disposed on the positive X-direction side of the first movable drive electrode 116 (refer to FIGS. 1 and 4). In the second structure 108, the first fixed drive electrode 130 is disposed on the positive X-direction side of the first movable drive electrode 116, while the first fixed drive electrode 132 is disposed on the negative X-direction side of the first movable drive electrode 116 (refer to FIGS. 1 and 4). Moreover, in the second fixed drive electrodes 134 and 136 interposing the second movable drive electrode 116 therebetween, in the first structure 106, the second fixed drive electrode 134 is disposed on the negative X-direction side of the second movable drive electrode 116, while the second fixed drive electrode 136 is disposed on the positive X-direction side of the second movable drive electrode 116 (refer to FIGS. 1 and 4). In the second structure 108, the second fixed drive electrode 134 is disposed on the positive X-direction side of the second movable drive electrode 116, while the second fixed drive electrode 136 is disposed on the negative X-direction side of the second movable drive electrode 116 (refer to FIGS. 1 and 4). Therefore, with the first AC voltage and the second AC voltage, a vibrating body 112a of the first structure 106 and a vibrating body 112b of the second structure 108 can be vibrated in phase opposition at a predetermined frequency along the X-axis. In the example shown in FIG. 5, the vibrating body 112a is displaced in an a1 direction, while the vibrating body 112b is displaced in an α2 direction opposite to the a1 direction. In the example shown in FIG. 6, the vibrating body 112a is displaced in the α2 direction, while the vibrating body 112b is displaced in the α1 direction.

The displacement portion 122 is displaced along the X-axis with the vibration of the vibrating body 112. Similarly, the movable detection electrode 126 (refer to FIGS. 1 and 4) is displaced along the X-axis with the vibration of the vibrating body 112.

Figure 7:
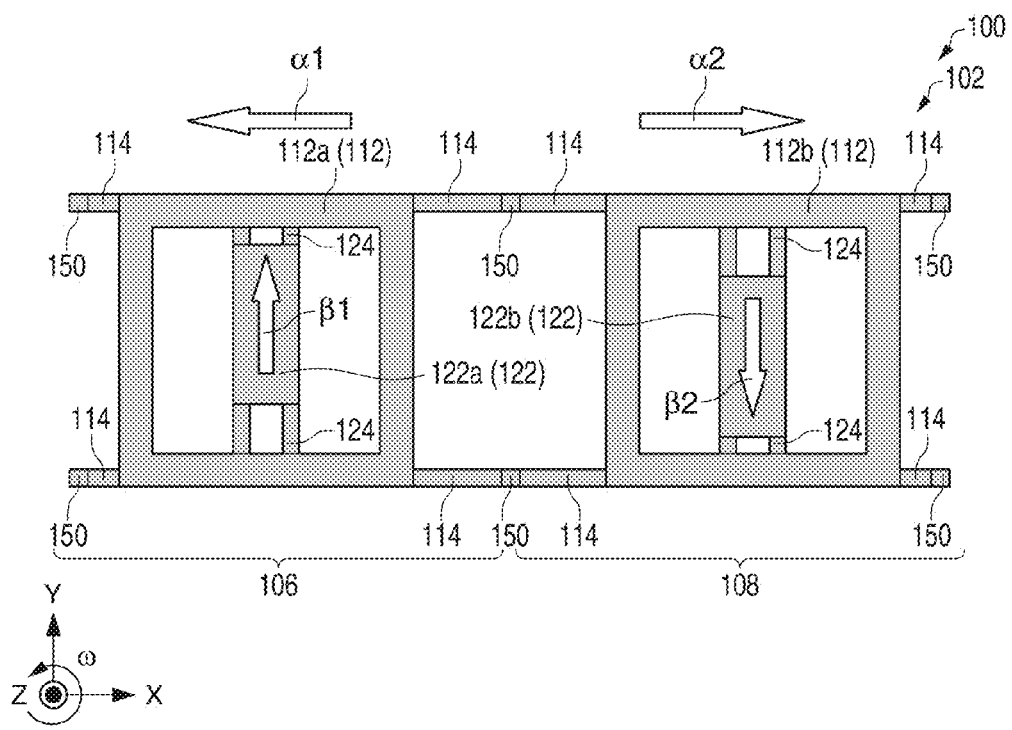
FIG. 7 explains operation of the gyro sensor according to the embodiment.
Figure 8:
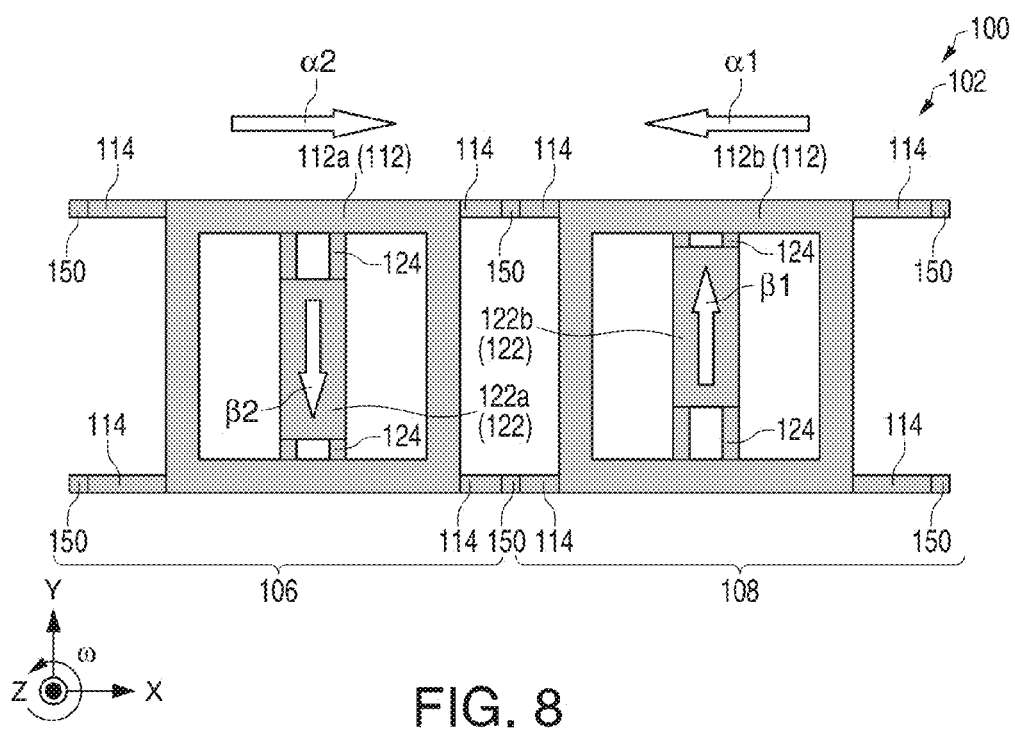
FIG. 8 explains operation of the gyro sensor according to the embodiment.

As shown in FIGS. 7 and 8, when angular velocity ω about the Z-axis is applied to the functional element 102 in a state where the vibrating bodies 112a and 112b vibrate along the X-axis, the Coriolis force acts and thus the displacement portion 122 is displaced along the Y-axis. That is, a displacement portion 122a connected to the vibrating body 112a and a displacement portion 122b connected to the vibrating body 112b are displaced in opposite directions along the Y-axis. In the example shown in FIG. 7, the displacement portion 122a is displaced in a β1 direction, while the displacement portion 122b is displaced in a β2 direction opposite to the β1 direction. In the example shown in FIG. 8, the displacement portion 122a is displaced in the β2 direction, while the second displacement portion 122b is displaced in the β1 direction.

The displacement portion 122a and 122b are displaced along the Y-axis, so that a distance between the movable detection electrode 126 and the fixed detection electrode 140 is changed (refer to FIGS. 1 and 4). Similarly, a distance between the movable detection electrode 126 and the fixed detection electrode 142 is changed (refer to FIGS. 1 and 4). Therefore, an electrostatic capacitance between the movable detection electrode 126 and the fixed detection electrode 140 is changed. Similarly, an electrostatic capacitance between the movable detection electrode 126 and the fixed detection electrode 142 is changed.

In the gyro sensor 100, a voltage is applied between the movable detection electrode 126 and the fixed detection electrode 140 via the detection wiring 30 and the fixed potential wiring 40, whereby the amount of change in the electrostatic capacitance between the movable detection electrode 126 and the fixed detection electrode 140 can be detected (refer to FIG. 1). Further, a voltage is applied between the movable detection electrode 126 and the fixed detection electrode 142 via the detection wiring 31 and the fixed potential wiring 40, whereby the amount of change in the electrostatic capacitance between the movable detection electrode 126 and the fixed detection electrode 142 can be detected (refer to FIG. 1). In this manner, the gyro sensor 100 can obtain the angular velocity ω about the Z-axis based on the amount of changes in the electrostatic capacitances between the movable detection electrode 126 and the fixed detection electrodes 140 and 142.

The gyro sensor 100 according to the embodiment has, for example, the following features.

According to the gyro sensor 100, the first drive wirings 20 and 21 are connected with the first fixed drive electrodes 130 and 132 and extend toward the negative X-direction side; the second drive wirings 22 and 23 are connected with the second fixed drive electrodes 134 and 136 and extend toward the negative X-direction side; and the detection wirings 30 and 31 are connected with the fixed detection electrodes 140 and 142 and extend toward the positive X-direction side. Therefore, according to the gyro sensor 100, the detection wiring 30 does not cross the drive wirings 20, 21, 22, and 23, and the detection wiring 31 does not cross the drive wirings 20, 21, 22, and 23. With this configuration, it is possible to suppress the flowing of current into the detection wiring 30 via a parasitic capacitance generated between each of the drive wirings 20, 21, 22, and 23 and the detection wiring 30. Similarly, it is possible to suppress the flowing of current into the detection wiring 31 via a parasitic capacitance generated between each of the drive wirings 20, 21, 22, and 23 and the detection wiring 31. As a result, the gyro sensor 100 can have, for example, high detection accuracy.

According to the gyro sensor 100, the first drive wirings 20 and 21 have, in the negative X-direction of the vibrating body 112, the portions (the second extending portion 20b and 21b) extending, in the negative Y-direction, from the first extending portion 20a and 21a to the second drive wirings 22 and 23, and the detection wirings 30 and 31 extend from the fixed detection electrodes 140 and 142 toward the positive X-direction side of the vibrating body 112. Therefore, it is possible to more reliably suppress the flowing of current into the detection wirings 30 and 31 via parasitic capacitances generated between the drive wirings 20, 21, 22, and 23 and the detection wirings 30 and 31.

According to the gyro sensor 100, the first drive wirings 20 and 21 and the second drive wirings 22 and 23 are connected to each other, respectively. With this configuration, the wiring can be shared, so that the number of wirings can be reduced.

2. Method for Manufacturing Gyro Sensor

Figure 9:
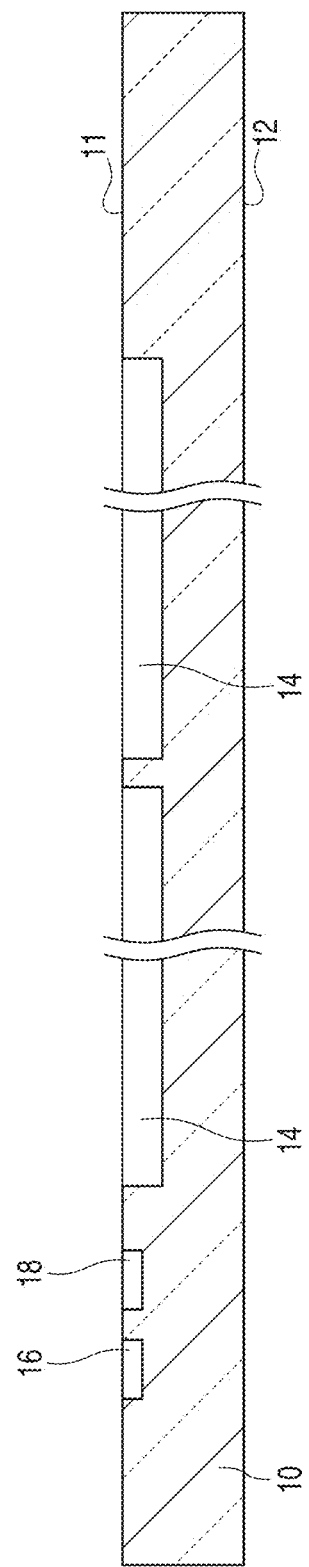
FIG. 9 is a cross-sectional view schematically showing a manufacturing process of the gyro sensor according to the embodiment.
Figure 10:
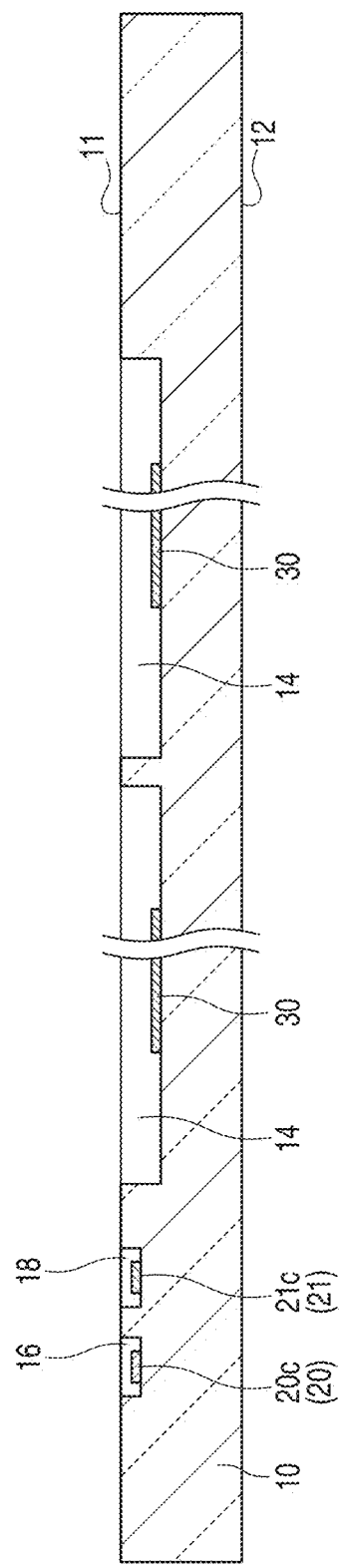
FIG. 10 is a cross-sectional view schematically showing a manufacturing process of the gyro sensor according to the embodiment.
Figure 11:
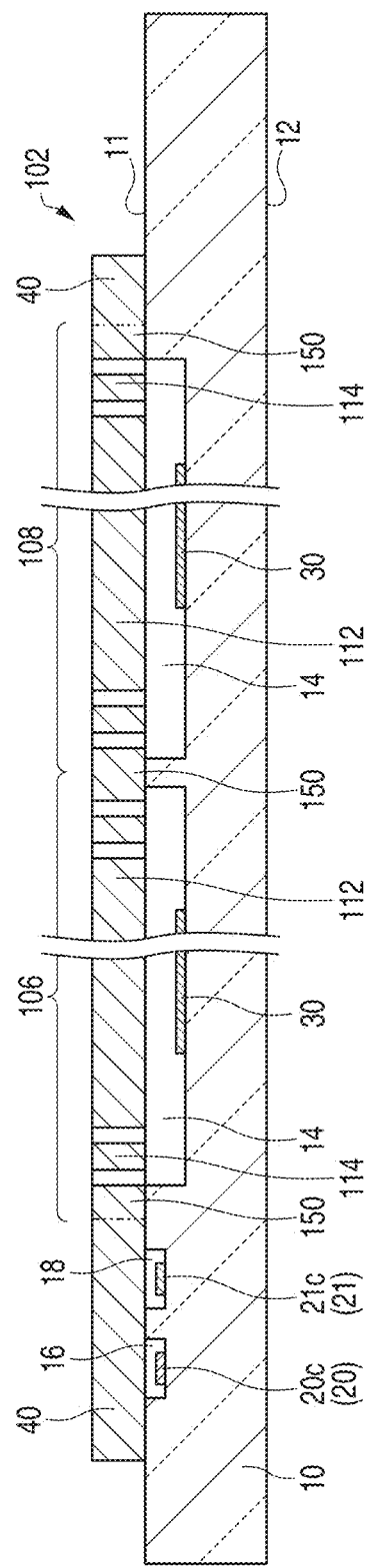
FIG. 11 is a cross-sectional view schematically showing a manufacturing process of the gyro sensor according to the embodiment.

Next, a method for manufacturing the gyro sensor according to the embodiment will be described with reference to the drawings. FIGS. 9 to 11 are cross-sectional views schematically showing manufacturing processes of the gyro sensor 100 according to the embodiment, corresponding to FIG. 2.

As shown in FIG. 9, the recesses 14 and the groove portions 16 and 18 are formed in the first surface 11 of the substrate 10. The recesses 14 and the groove portions 16 and 18 are formed by, for example, a photolithographic technique and an etching technique. With this configuration, the substrate 10 having the recesses 14 and the groove portions 16 and 18 disposed in the first surface 11 can be prepared.

As shown in FIG. 10, the detection wirings 30 and 31 are formed on the substrate 10 including the interiors of the recesses 14; the first portions 20c and 21c of the first drive wirings 20 and 21 are formed in the groove portions 16 and 18, respectively; and further the first portions (not shown) disposed in the groove portions of the second drive wirings 22 and 23 are formed. At the same time, the connection wirings 24, 25, 32, and 33 can be formed on the substrate 10. The first portions 20c and 21c of the first drive wirings 20 and 21, the first portions of the second drive wirings 22 and 23, and the wirings 24, 25, 30, 31, 32, and 33 are formed by, for example, deposition by a sputtering method, a CVD (Chemical Vapor Deposition) method, or the like and then patterning by a photolithographic technique and an etching technique.

As shown in FIG. 11, the functional element 102 is formed on the substrate 10. More specifically, the functional element 102 is formed by placing (bonding) a silicon substrate (not shown) on the first surface 11 of the substrate 10, thinning the silicon substrate, and then patterning the silicon substrate. The patterning is performed by a photolithographic technique and an etching technique. The bonding of the silicon substrate with the substrate 10 is performed by, for example, anodic bonding.

In the process for forming the functional element 102, the portions (second portions) of the drive wirings 20, 21, 22, and 23, where the portions are disposed on the first surface 11, can be formed to form the drive wirings 20, 21, 22, and 23, and further the fixed potential wiring 40 can be formed.

As shown in FIG. 2, the substrate 10 and the lid 50 are bonded together to accommodate the functional element 102 in the cavity 52 surrounded by the substrate 10 and the lid 50. The bonding of the substrate 10 with the lid 50 is performed by, for example, anodic bonding.

Through the processes described above, the gyro sensor 100 can be manufactured.

According to the method for manufacturing the gyro sensor 100 as described above, it is possible to form the gyro sensor 100 that can suppress the flowing of current into the detection wirings 30 and 31 via parasitic capacitances generated between the drive wirings 20, 21, 22, and 23 and the detection wirings 30 and 31.

3. Electronic Apparatuses

Next, electronic apparatuses according to the embodiment will be described with reference to the drawings. The electronic apparatuses according to the embodiment include the gyro sensor according to the embodiment of the invention. In the following, electronic apparatuses including the gyro sensor 100 as the gyro sensor according to the embodiment of the invention will be described.

Figure 12:
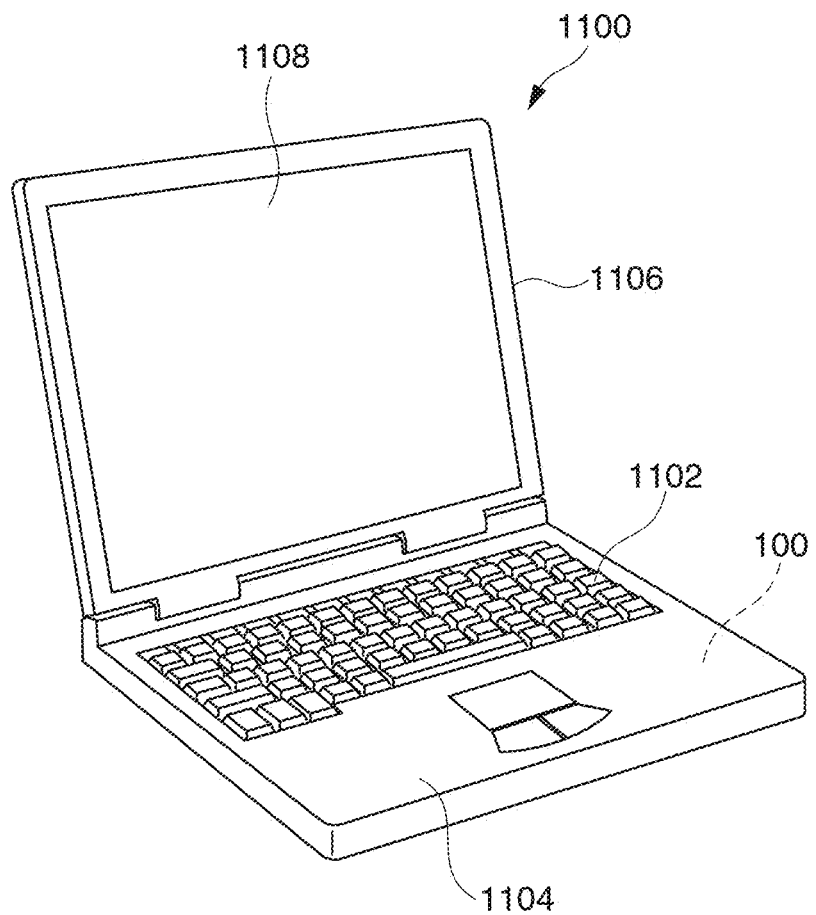
FIG. 12 is a perspective view schematically showing an electronic apparatus according to the embodiment.

FIG. 12 is a perspective view schematically showing a mobile (or notebook) personal computer 1100 as an electronic apparatus according to the embodiment.

As shown in FIG. 12, the personal computer 1100 includes a main body portion 1104 including a keyboard 1102 and a display unit 1106 having a display portion 1108. The display unit 1106 is rotationally movably supported relative to the main body portion 1104 via a hinge structure portion.

In the personal computer 1100, the gyro sensor 100 is incorporated.

Figure 13:
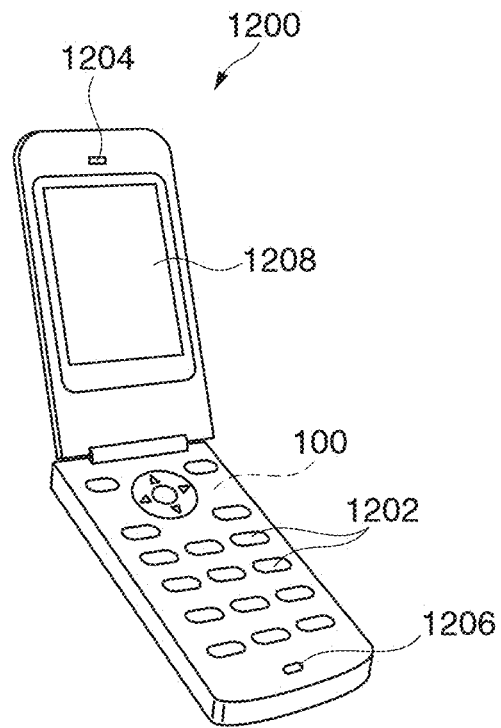
FIG. 13 is a perspective view schematically showing an electronic apparatus according to the embodiment.

FIG. 13 is a perspective view schematically showing a mobile phone (including a PHS) 1200 as an electronic apparatus according to the embodiment.

As shown in FIG. 13, the mobile phone 1200 includes a plurality of operation buttons 1202, an earpiece 1204, and a mouthpiece 1206. A display portion 1208 is arranged between the operation buttons 1202 and the earpiece 1204.

In the mobile phone 1200, the gyro sensor 100 is incorporated.

Figure 14:
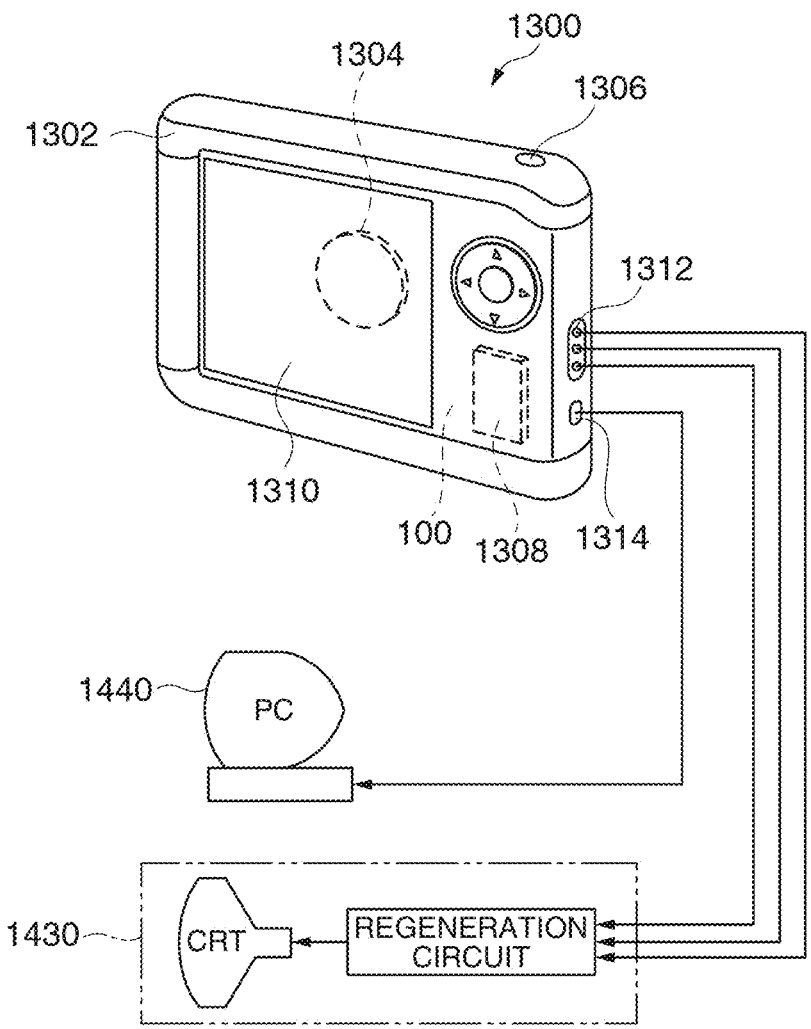
FIG. 14 is a perspective view schematically showing an electronic apparatus according to the embodiment.

FIG. 14 is a perspective view schematically showing a digital still camera 1300 as an electronic apparatus according to the embodiment. In FIG. 14, connections with external apparatuses are also shown in a simplified manner.

Here, usual cameras expose a silver halide photographic film with an optical image of a subject, whereas the digital still camera 1300 photoelectrically converts an optical image of a subject with an imaging element such as a CCD (Charge Coupled Device) to generate imaging signals (image signals).

A display portion 1310 is disposed on the back surface of a case (body) 1302 in the digital still camera 1300 and configured to perform display based on imaging signals generated by a CCD. The display portion 1310 functions as a finder that displays a subject as an electronic image.

Moreover, on the front side (the rear side in the drawing) of the case 1302, a light receiving unit 1304 including an optical lens (imaging optical system) and a CCD is disposed.

When a photographer confirms a subject image displayed on the display portion 1310 and presses down a shutter button 1306, imaging signals of a CCD at the time are transferred to and stored in a memory 1308.

Moreover, in the digital still camera 1300, a video signal output terminal 1312 and a data communication input/output terminal 1314 are disposed on the side surface of the case 1302. Then, a television monitor 1430 and a personal computer 1440 are connected as necessary to the video signal output terminal 1312 and the data communication input/output terminal 1314, respectively. Further, the imaging signals stored in the memory 1308 are output to the television monitor 1430 or the personal computer 1440 by a predetermined operation.

In the digital still camera 1300, the gyro sensor 100 is incorporated.

The electronic apparatuses 1100, 1200, and 1300 described above can have the gyro sensor 100 that can suppress the flowing of current into the detection wiring via a parasitic capacitance generated between the drive wiring and the detection wiring.

An electronic apparatus including the gyro sensor 100 can be applied to for example, in addition to the personal computer (mobile personal computer) shown in FIG. 12, the mobile phone shown in FIG. 13, and the digital still camera shown in FIG. 14, inkjet ejection apparatuses (for example, inkjet printers), laptop personal computers, television sets, video camcorders, video tape recorders, head-mounted displays, various kinds of navigation systems, pagers, electronic notebooks (including those with communication function), electronic dictionaries, calculators, electronic gaming machines, word processors, workstations, videophones, surveillance television monitors, electronic binoculars, POS terminals, medical equipment (for example, electronic thermometers, sphygmomanometers, blood glucose meters, electrocardiogram measuring systems, ultrasonic diagnosis apparatuses, and electronic endoscopes), fishfinders, various kinds of measuring instrument, indicators (for example, indicators used in vehicles, aircraft, rockets, and ships), the attitude control of robots or the human body, flight simulators, and the like.

The invention includes a configuration (for example, a configuration having the same function, method, and result, or a configuration having the same advantage and effect) that is substantially the same as those described in the embodiment. Moreover, the invention includes a configuration in which a non-essential portion of the configurations described in the embodiment is replaced. Moreover, the invention includes a configuration that provides the same operational effects as those of the configurations described in the embodiment, or a configuration that can achieve the same advantages. Moreover, the invention includes a configuration in which a publicly known technique is added to the configurations described in the embodiment.

The entire disclosure of Japanese Patent Application No. 2012-083974, filed Apr. 2, 2012 is expressly incorporated by reference herein.

What is claimed is:

1. A gyro sensor comprising:
    a vibrating body that performs drive-vibration along a driving vibration direction, the vibrating body having first through fourth sides;
    first and second fixed drive electrodes that are disposed at the first side of the vibrating body so as to be spaced apart from the first side in a plan view;
    third and fourth fixed drive electrodes that are disposed at the second side opposite to the first side of the vibrating body so as to be spaced apart from the second side in the plan view;
    first and second detection electrodes that detect a signal changing according to angular velocity of the vibrating body;
    first and second drive wirings that are connected to the first and second fixed drive electrodes, respectively, the first and second drive wirings being disposed at the first side and the third side of the vibrating body so as to be spaced apart from the first and third sides;
    third and fourth drive wirings that are connected to the third and fourth fixed drive electrodes, respectively, the third and fourth drive wirings being disposed at the second side and the third side of the vibrating body so as to be spaced apart from the second and third sides; and
    first and second detection wirings that are connected to the first and second detection electrodes, respectively, the first and second detection wirings being disposed at the fourth side opposite to the third side of the vibrating body so as to extend from the fourth side.

2. The gyro sensor according to claim 1, wherein
    the first and second drive wirings extend along the first side and the third side of the vibrating body.

3. The gyro sensor according to claim 2, wherein
    the first and second drive wirings and the third and fourth drive wirings are respectively connected to each other.

4. The gyro sensor according to claim 3, wherein
    each of the first through fourth drive wirings and each of the first and second detection wirings does not cross each other.

5. The gyro sensor according to claim 2, wherein
    each of the first through fourth drive wirings and each of the first and second detection wirings does not cross each other.

6. The gyro sensor according to claim 1, wherein
    the first and second drive wirings and the third and fourth drive wirings are respectively connected to each other.

7. The gyro sensor according to claim 6, wherein
    each of the first through fourth drive wirings and each of the first and second detection wirings does not cross each other.

8. The gyro sensor according to claim 1, wherein
    each of the first through fourth drive wirings and each of the first and second detection wirings does not cross each other.

9. The gyro sensor according to claim 1, further comprising a first movable drive electrode that extends from the first side of the vibrating body and a second movable drive electrode that extends from the second side of the vibrating body, wherein
    the first and second fixed drive electrodes are disposed to face the first movable electrode, and
    the third and fourth fixed drive electrodes are disposed to face the second movable drive electrode.

10. The gyro sensor according to claim 1, further comprising:
    a displacement portion that is connected to the vibrating body via a spring portion; and
    a movable detection electrode that extends from the displacement portion, wherein
    the first and second fixed detection electrodes are disposed to face the movable detection electrode.

11. The gyro sensor according to claim 1, wherein
    the vibrating body is in a frame-like shape, and
    the first and second fixed detection electrodes are disposed inside of an outer periphery of the vibrating body in the plan view.

12. An electronic apparatus comprising:
    the gyro sensor according to claim 1, and
    a display that display an image.

13. The gyro sensor according to claim 1, wherein
    the first and second detection wirings further extends in a direction along the fourth side of the vibrating body.

* * * * *